(12) United States Patent
Eberly (10) Patent No.: US 12,459,347 B2
(45) Date of Patent: Nov. 4, 2025

(54) FOUR WHEEL DRIVE CONVERSION ASSEMBLY FOR LAWN CARE EQUIPMENT

(71) Applicant: Troy Eberly, Hartville, OH (US)

(72) Inventor: Troy Eberly, Hartville, OH (US)

(*) Notice: Subject to any disclaimer, the term of this patent is extended or adjusted under 35 U.S.C. 154(b) by 775 days.

(21) Appl. No.: 17/750,905

(22) Filed: May 23, 2022

(65) Prior Publication Data
US 2023/0219407 A1    Jul. 13, 2023

Related U.S. Application Data

(60) Provisional application No. 63/297,913, filed on Jan. 10, 2022.

(51) Int. Cl.
*B60K 6/52*      (2007.10)
*B60K 17/348*    (2006.01)
*B60K 17/356*    (2006.01)

(52) U.S. Cl.
CPC .............. *B60K 6/52* (2013.01); *B60K 17/348* (2013.01); *B60K 17/356* (2013.01); *B60Y 2200/223* (2013.01)

(58) Field of Classification Search
CPC ...... B60K 6/52; B60K 17/348; B60K 17/356; B60Y 2200/223
USPC ....................................................... 180/233
See application file for complete search history.

(56) References Cited

U.S. PATENT DOCUMENTS

| 1,855,868 | A | * | 4/1932 | Porter | .................... | B60G 5/047 |
| | | | | | | 180/22 |
| 2,341,883 | A | * | 2/1944 | Sloan | ..................... | B62D 55/04 |
| | | | | | | 180/9.62 |
| 4,942,726 | A | * | 7/1990 | Bowditch | .............. | A01D 34/82 |
| | | | | | | 280/43.13 |
| 2022/0369549 | A1 | * | 11/2022 | Baker | .................. | B60K 7/0007 |

FOREIGN PATENT DOCUMENTS

DE    102015012757 A1 *  4/2017   ................ B60F 1/04

OTHER PUBLICATIONS

Slide—Definition by Merriam-Webster Online Dictionary. Retrieved from URL https://www.merriam-webster.com/dictionary/slide on Mar. 18, 2025 (Year: 2025).*

* cited by examiner

*Primary Examiner* — Valentin Neacsu
*Assistant Examiner* — Tyler Jay Stanley
(74) *Attorney, Agent, or Firm* — Harpman & Harpman (57) ABSTRACT

A drive wheel conversion system for self-propelled hydrostatic wheel driven riding/standing lawn care equipment platforms that provide a quick and easy conversion of conventional trailing caster wheel assemblies to independent driven power drive wheels. Such conversion enables a four-wheel drive lawn care vehicle that has interchangeable mower attachments capable for a wide variety of operable use, as needed, on an existing standard lawncare self-propelled platform.

9 Claims, 12 Drawing Sheets

FOUR WHEEL DRIVE CONVERSION ASSEMBLY FOR LAWN CARE EQUIPMENT

This application claims the benefit of U.S. Provisional Application No. 63/297,913, filed on Jan. 10, 2022.

BACKGROUND OF THE INVENTION

1. Technical Field

This invention relates to self-propelled riding/standing lawncare vehicles having independent direct drive wheels for propulsion and steering. Such lawncare vehicles have interchangeable attachments and tight turning capabilities for improved maneuverability.

2. Description of Prior Art

There is no known prior art for drive wheel conversions on existing lawn care direct drive independent wheel steering assemblies, only two and four wheel drive off road vehicles are known.

SUMMARY OF THE INVENTION

A conversion assembly and system for modifying existing self-propelled lawn care equipment platforms from a two-wheel drive system to a four-wheel independent drive and steering application. The conversion relies on modified trailing castor wheel assemblies and pairs of independently powered hydrostatically driven drive wheels with associated frame fabrication for ease of connection and power through existing hydraulic pump system on the lawn mowing platform.

DETAILED DESCRIPTION OF THE INVENTION

A conversion system for two-wheel drive lawn care equipment having independent drive wheels used for steering and propulsion as is known in the art.

Figure 1:
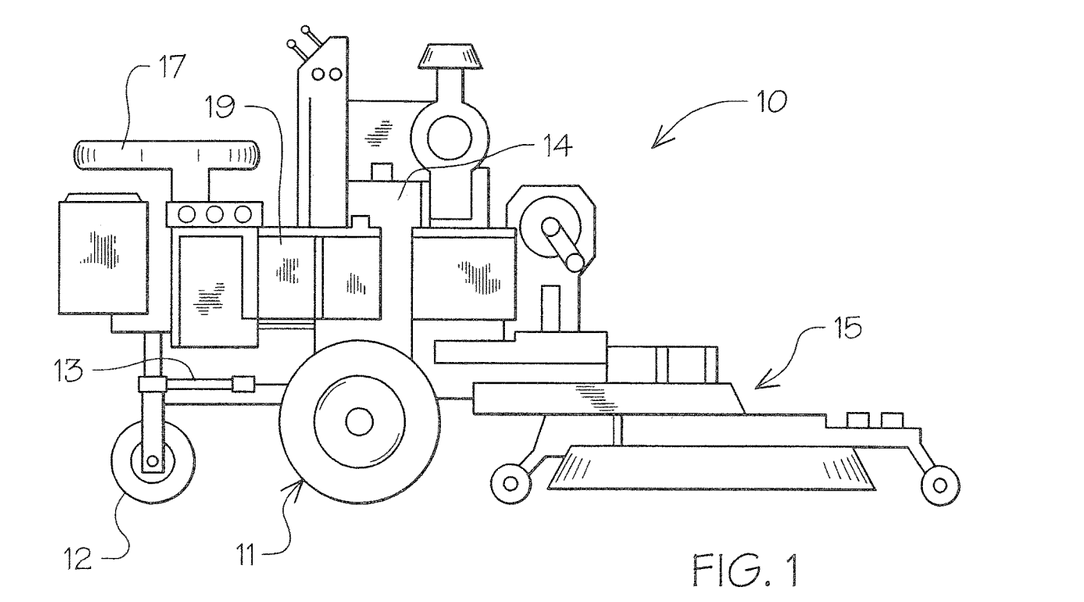
FIG. 1 is a side elevational view of a two-wheel drive lawn care vehicle with trailing rear castor wheels and a front mounted lawn mower deck.

Referring to FIG. 1 of the drawings, a self-propelled lawn care equipment 10 can be seen having a pair of hydrostatically powered steering and drive wheels 11 and a pair of following nondriven castor wheel assemblies 12 mounted on the vehicle support frame 13 which has a main power source 14. A mower deck 15 which is removably attached to the frame 13 forward of the drive wheel assembly 11.

It will be seen that direct drive steering is achieved by independently driven drive wheels 11 allowing for sharp turns as is known in the art.

Figure 2:
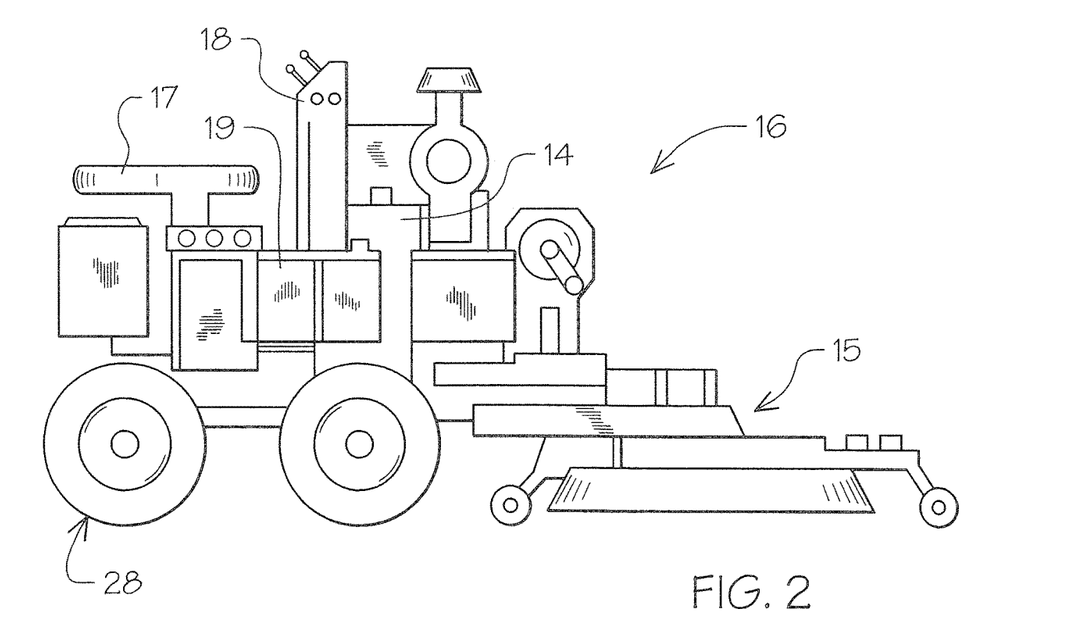
FIG. 2 is a side elevational view of a converted two-wheel drive lawn care vehicle to four-wheel drive with the addition of independently powered rear wheel assemblies.
Figure 3:
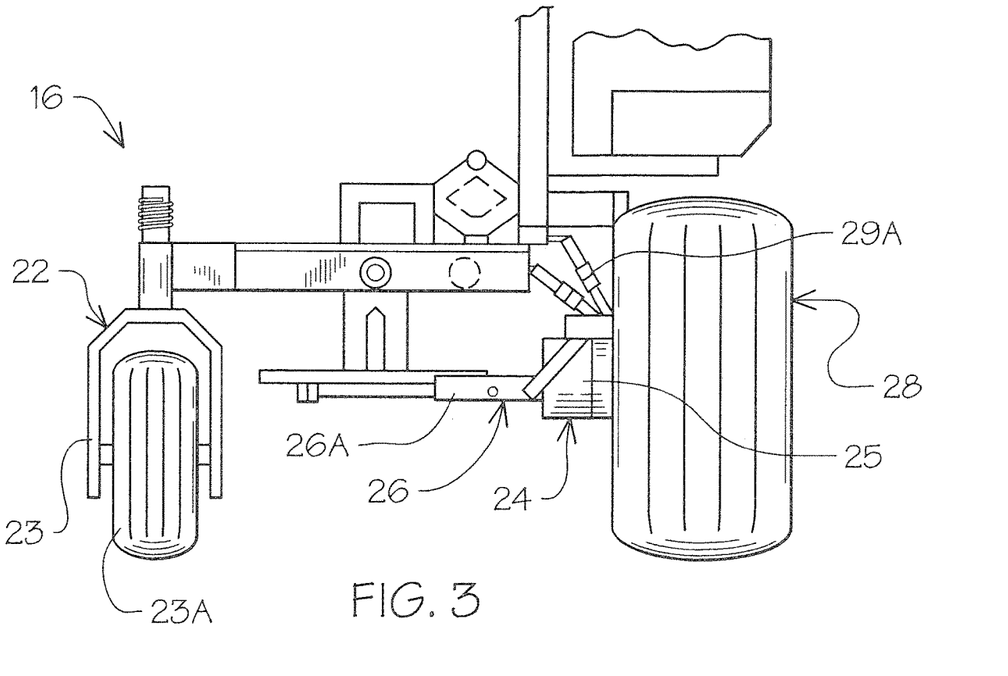
FIG. 3 is an enlarged partial elevational view of the drive conversion and existing castor wheel assemblies.

Referring to FIGS. 2 and 3 of the drawings, the present invention is illustrated on a modified riding/standing lawn care equipment 16. As such, a seat 17, in this example, is positioned adjacent the original respective nondriven castor wheels 12 with steering and drive controls 18 allowing for selective application of hydrostatic power to the steering and drive wheels 11 from the main power source 14 and hydraulic pump assembly 19. The conversion system disclosed for four-wheel drive comprises a modified castor wheel support mounting frame having a "oscillating" tube 20 with oppositely disposed tubular end mounting fittings 21 to registerably receive a pair of modified mounting castor wheel assemblies 22, as seen in FIG. 3 of the drawings. The castor wheel assemblies 22 have a bifurcated wheel support yolk 23 and caster wheel 23A with an upstanding pivot bearing fitting and modified extension for telescopic engagement within respective end mounting fittings 21, as noted.

Figure 4:
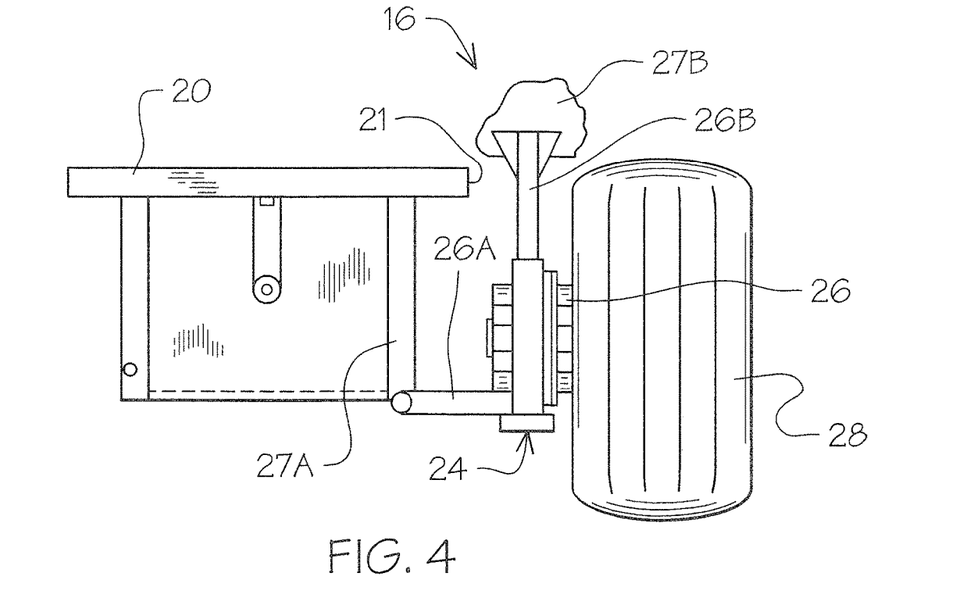
FIG. 4 is a partial enlarged top plan view of one drive wheel conversion assembly.
Figure 5:
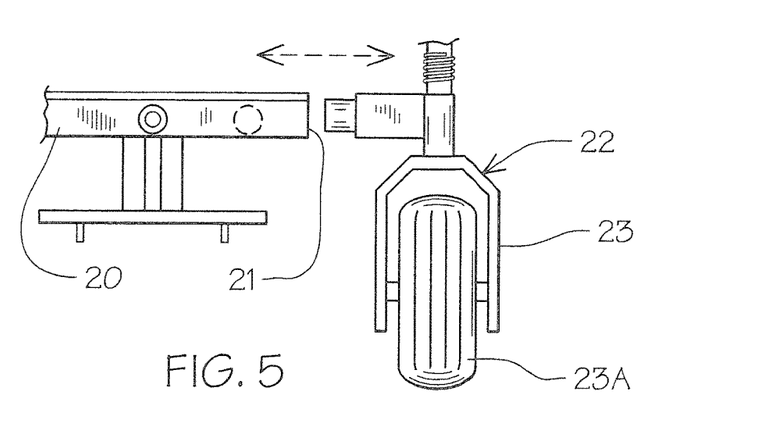
FIG. 5 is a partial end elevational view of a castor wheel assembly removed for modification on a support frame.

A pair of hydrostatic drive wheel assemblies 24 of the invention have a hydrostatic motor 25 secured on a fabricated mounting assembly 26 with a pair of apertured extending brackets 26A and 26B that are bolted to correspondingly align vehicle frame mounting elements 27A and 27B in spaced relation to the respective tubular end mounting fittings 21. It will be apparent to those skilled in the art that such mounting brackets can be of varied designs capable of securely mounting the mounting assembly 24 and hydrostatic motor 25 to the modified lawn care support frame. A pair of auxiliary drive wheels are mounted respectively to the hydrostatic motors 25 for direct drive thereby. A pair of quick connect hydraulic line fittings 29A and 29B are connected to corresponding hydraulic line fittings on the respective hydraulic motors 25 providing fluid communication with the hydraulic pump 19 via a control valve manifold associated with hydraulic activation controls 18. The converted lawncare equipment 16 now has four-wheel drive and steering improving usability and traction in varied terrain. It will also be seen that due to the adjacent positioning of the respective paired drive wheel assemblies 11 and 28 that the effective steering is maintained by wheel engagement with the turf during turning.

Figure 6:
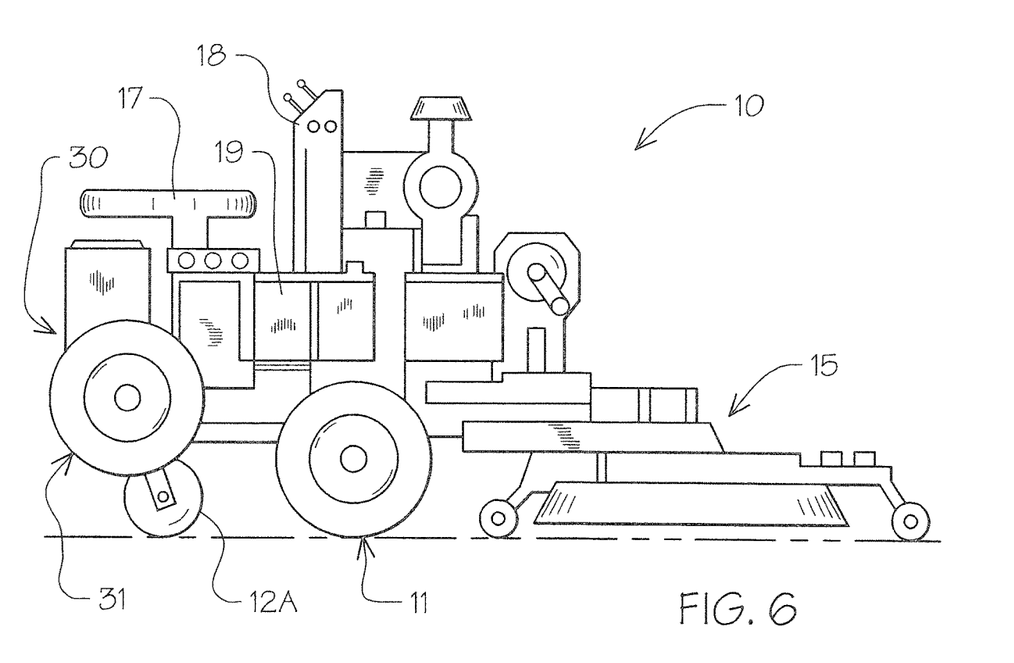
FIG. 6 is a side elevational view of an alternate form of the conversion system having integrated deployable dual drive wheel system nondeployed.
Figure 7:
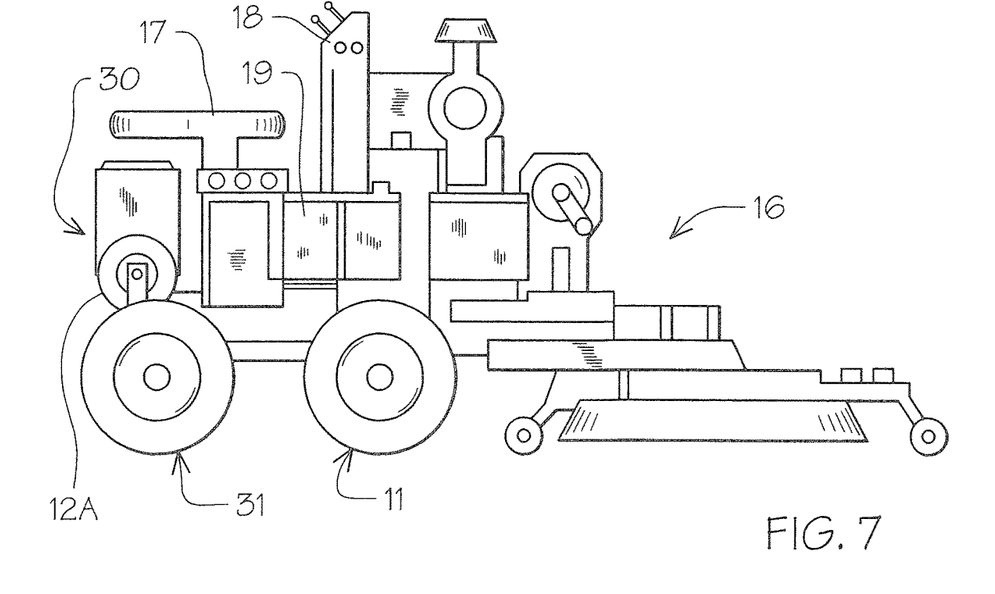
FIG. 7 is a side elevational view of an alternate form of the conversion system having integrated deployable dual drive wheel system deployed.
Figure 8:
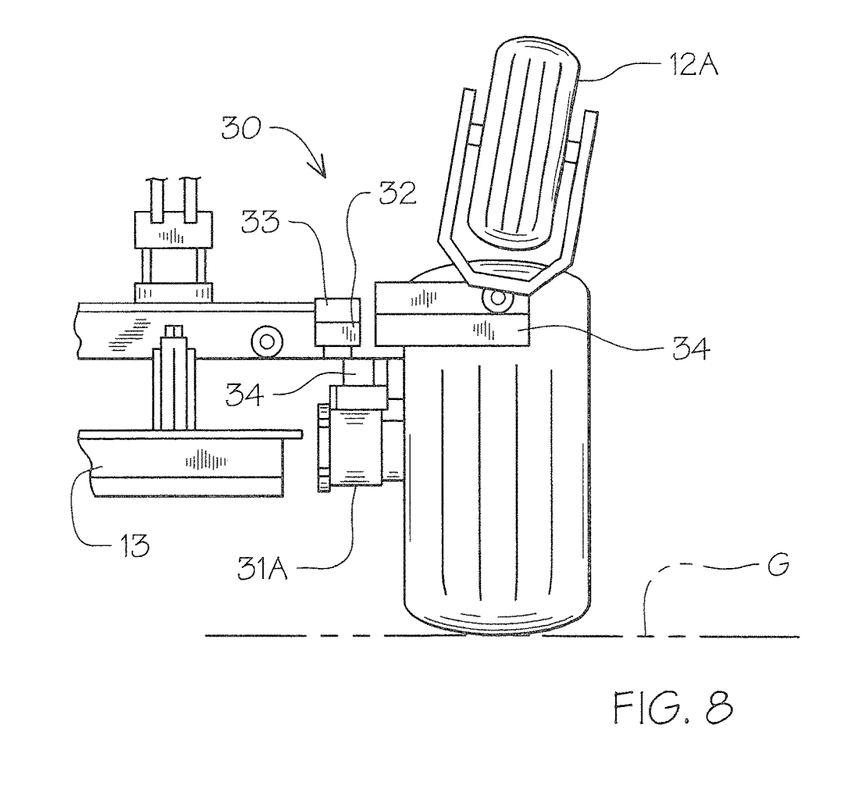
FIG. 8 is an enlarged partial end elevated view of the drive wheel assembly with drive wheel deployed.
Figure 9:
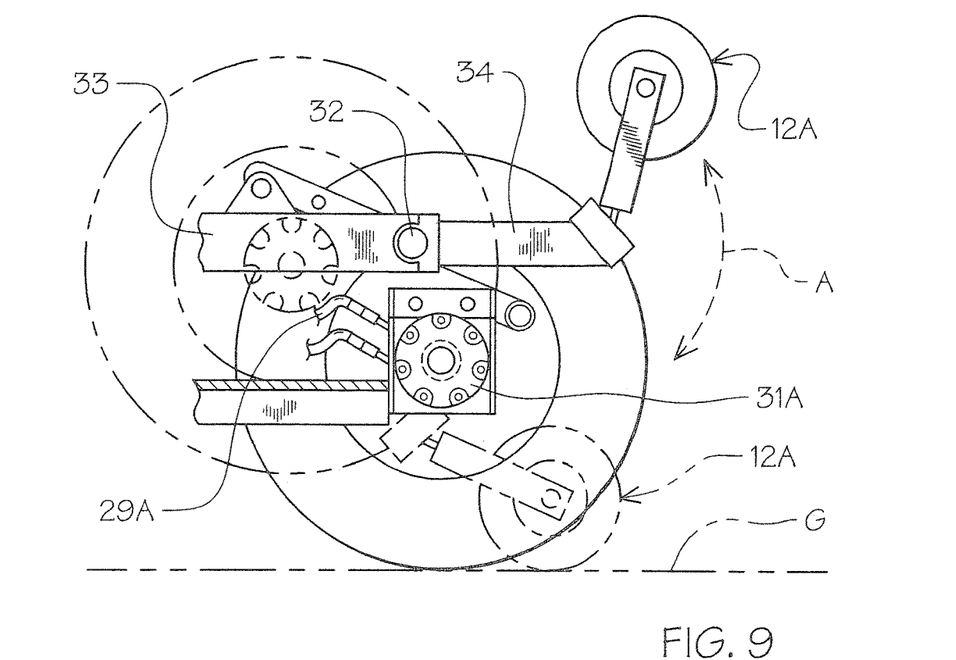
FIG. 9 is an enlarged partial side elevational view of the drive wheel/caster assembly with castor wheel deployed in broken lines.

Referring now to FIGS. 6-9 of the drawings, a first alternate form of the conversion system for two-wheel drive lawncare equipment to four-wheel drive can be seen wherein the lawncare equipment 10 has an interengageable deployable dual wheel system 30. As best seen in FIG. 6 of the drawings, the lawncare equipment 10 with the conventional two-wheel drive configuration having the drive wheel assemblies 11 with the deployable dual wheel system 30. A pair of auxiliary drive wheel assemblies 31 are mounted in elevated nonengagement position on the dual wheel system 30 in FIG. 6 of the drawings. Upon activation the auxiliary drive wheel assemblies 31 will swivel around a control central pivot point 32 indicated by broken lines and directional arrow A so as to engage the ground G as seen in FIGS. 8 and 9 of the drawings while a corresponding extending nondriven modified castor wheel assemblies 12A pivotally secured thereto will rotate there about for a ground engagement as seen in FIG. 6 of the drawings and in broken lines in FIG. 9 of the drawings. The dual wheel system 30 has a support frame 33 with angular offset bifurcated brackets 34 that extend therefrom. Each of the powered drive wheel assemblies 31 have a hydraulic motor 31A in fixed communication via supply lines 34 with the hydraulic pump assembly 19 in this application. It will be evident that a hydraulic control diverter valve assembly, not shown, may be used on the supply lines 34, if needed, to selectively isolate the power drive wheel assemblies 31 when not deployed and in use. Rotational deployment of the respective caster wheel modified assemblies 12A or the drive wheel assemblies 31 may be controlled by a powered assembly, not shown, pivotally secured to the corresponding leverage points on the selected bracket 34 of the dual wheel system support frame 30 so it can be easily retrofitted to modified support frame 13 of the lawncare equipment as hereinbefore described.

As evident from the above description, a substitution of components of the doctrine of equivalency which states that elements may be substituted if they are of equal use consideration. An example would be the substitution of independent electric drive motors, not shown, for respective hydraulic motors 31A, thus functioning as a power drive source to the respective wheels.

It will also be evident that an electric motor may be used to drive the hydraulic pump 19 to maintain the hydrostatic drive system as a substitution for the main power source traditionally an internal combustion engine, power source, found in such lawncare applications heretofore.

The key element therefore disclosed is the adaptability of four-wheel direct drive to existing two-wheel drive/steering lawncare equipment as well as to purpose-built four-wheel drive equipment heretofore found primarily in the form of four-wheel drive tractors and off-road vehicles ATVs.

Referring now to FIGS. 10-13 of the drawings, the third alternate form 35 of the two-wheel drive conversion for a lawncare vehicle is illustrated wherein an interchangeable deployable dual wheel assembly 36 can be seen having a support frame engagement assembly 37 with an angular upstanding support bracket 38 therefrom for each of the respective power wheel drive assemblies 36 of the conversion that will be described in detail hereinafter.

Each of the power drive wheel assemblies 36 has a hydrostatic motor 39 on a mounting frame 40 in communication via fluid supply lines L with the hydrostatic pump assembly 19 including the hydraulic control diverter valve assembly for selective isolation power to the power wheel assembly as set forth in the first alternate dual drive wheel system 26 as hereinbefore described.

Figure 10:
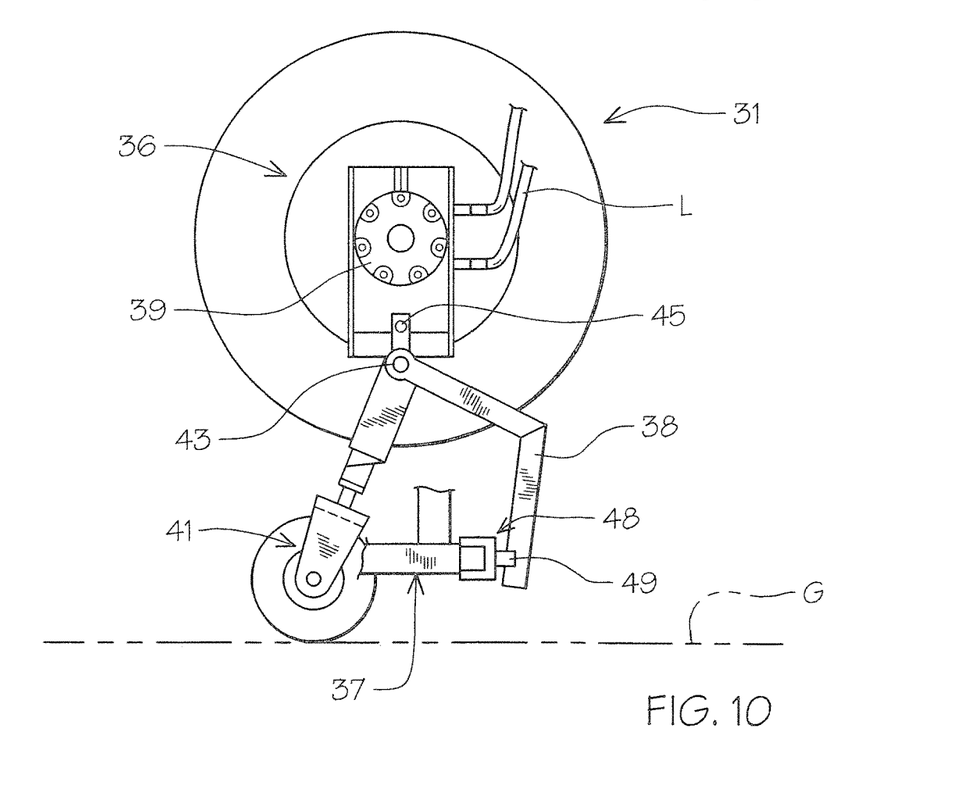
FIG. 10 is a partial side elevational view of a second alternate drive wheel conversion assembly in drive wheel engaged position.
Figure 11:
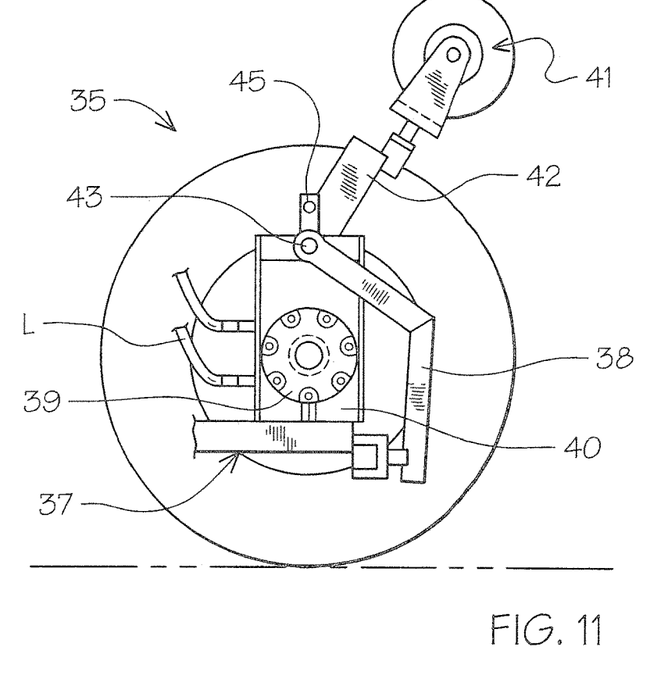
FIG. 11 is a partial side elevational view thereof in non-drive wheel position.
Figure 12:
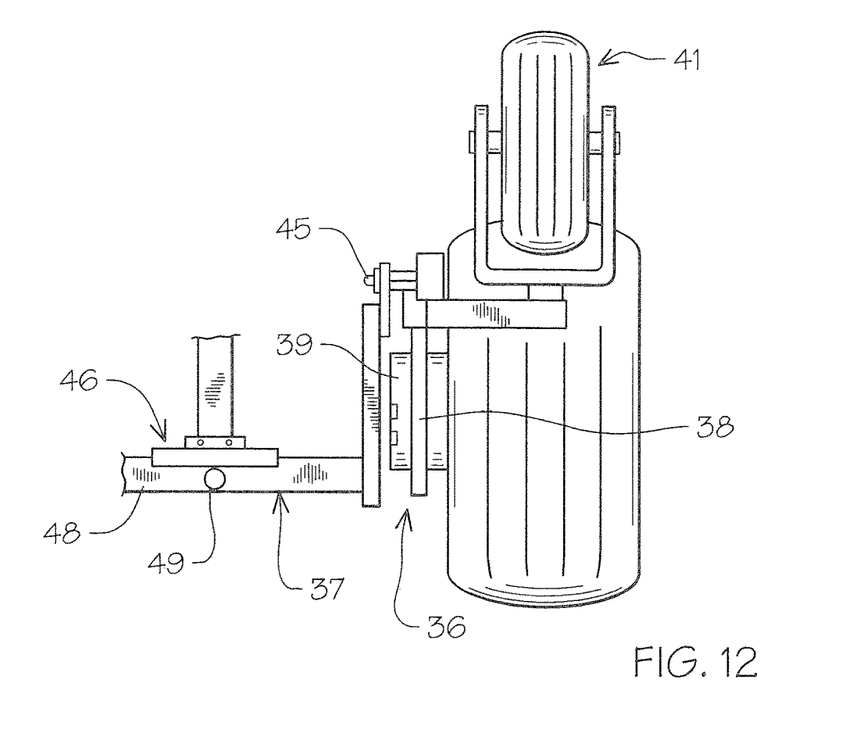
FIG. 12 is a partial end elevational view thereof.
Figure 13:
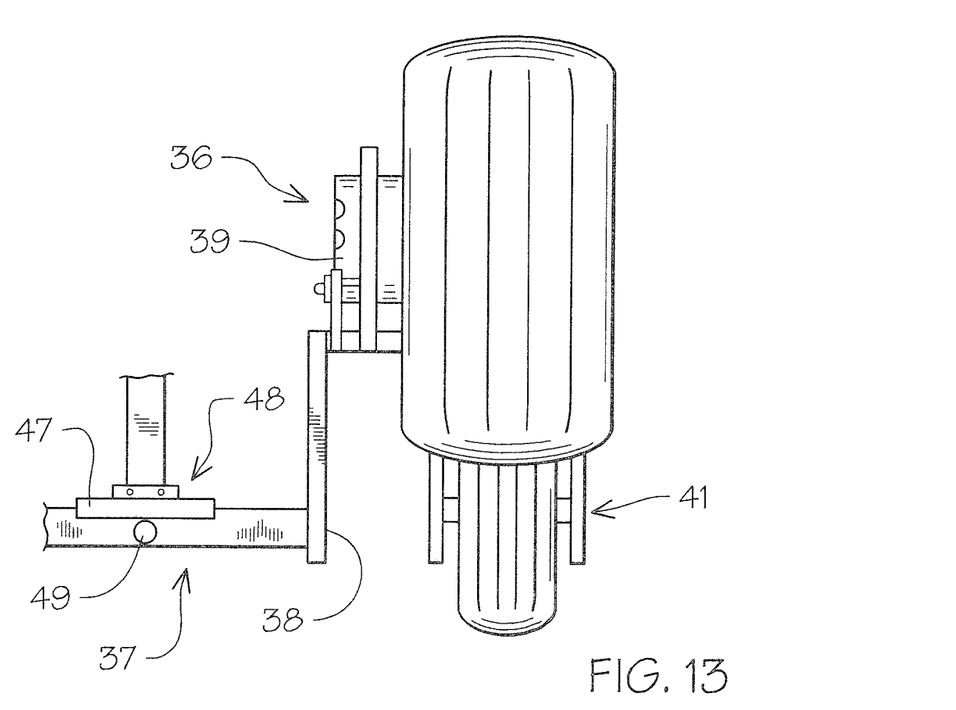
FIG. 13 is a partial end elevational view thereof in a non-drive wheel position.

A caster wheel assembly 41 has a mounting bracket 42 that extends from a central frame pivot 43 from which the angular offset support bracket 38 extends. As is evident from the above description, the power drive wheel assemblies 36 will pivot from a non-engaged position, as seen in FIGS. 10 and 13 of the drawings to a drive wheel ground engagement position as seen in FIGS. 11 and 12 of the drawings. Correspondingly, the respective caster wheel assemblies 41 will thereby pivot with a non-ground engagement position as seen in FIGS. 11 and 12 and therefore to a ground engagement position as seen in FIGS. 10 and 13 of the drawings. A locking pin 45 is removable and selectively secures the pivoting power wheel and caster wheel assemblies as required during rotational deployment.

Positional reorientation of each of the respective drive wheel assemblies 36 will require a vehicle frame lift, not shown, during rotation availability by an auxiliary lifting jack as will be well known to those skilled in the art.

Figure 14:
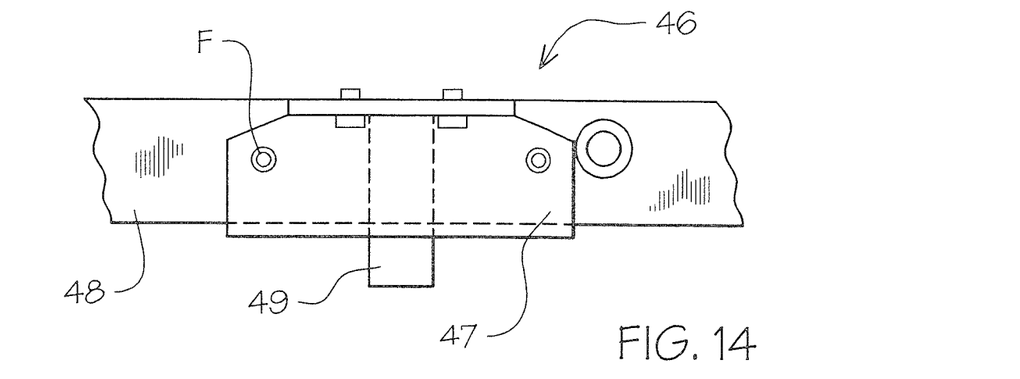
FIG. 14 is an enlarged partial top plan view of the axle frame locking bracket for the drive wheel conversion assembly.
Figure 15:
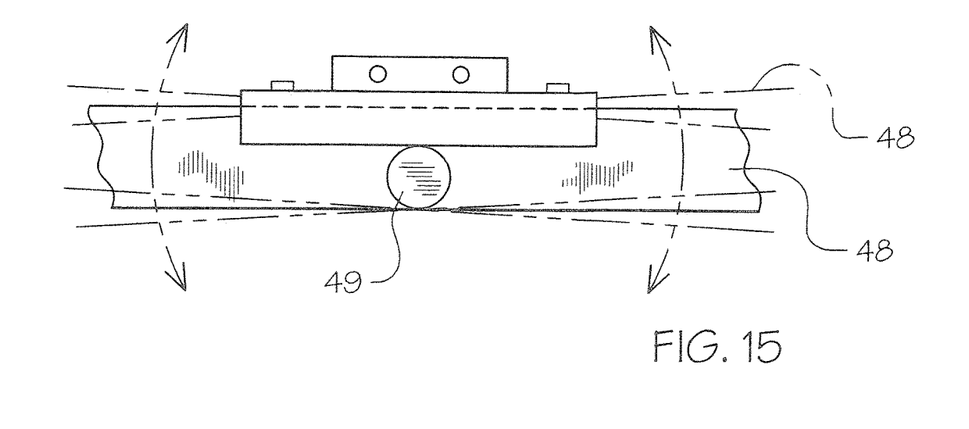
FIG. 15 is an enlarged end elevational view thereof with frame axle support range of motion shown in broken lines.
Figure 16:
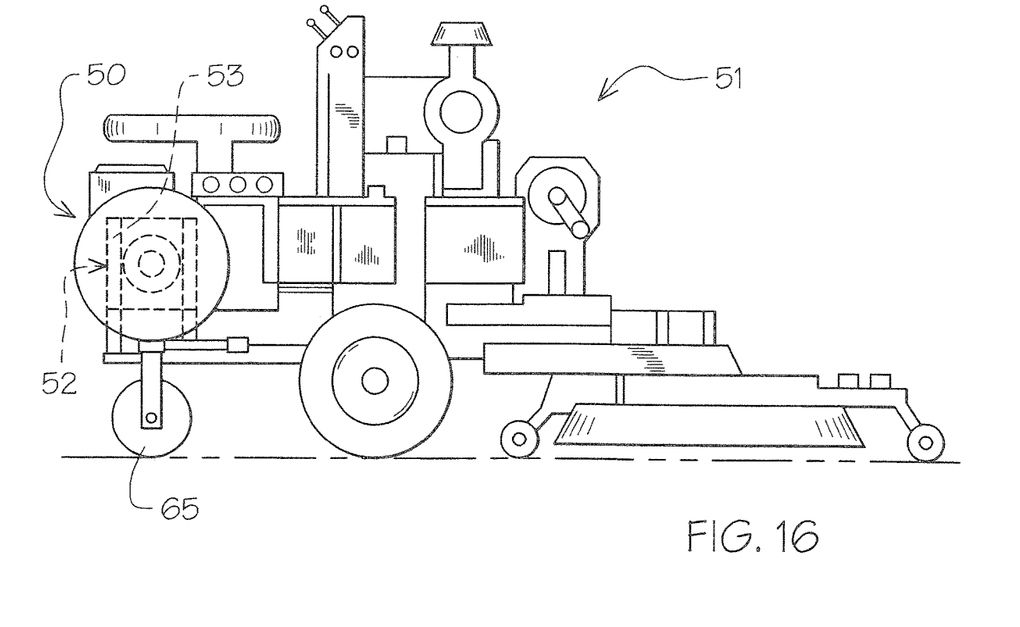
FIG. 16 is a side elevational view of a third alternate conversion two-wheel drive lawn care equipment vehicle showing the wheel conversion assembly in non-engaged position.

Referring now to FIGS. 14-15 of the drawings, a support frame axle locking assembly bracket 46 can be seen wherein an apertured locking plate 47 is selectively secured to the support frame axle portion 48 over the drive wheel frame support rod 49 that extends from the main frame of the lawncare equipment vehicle. The locking plate 47 can be secured in place to the frame preventing movement on the support rod 48 when the drive wheels are deployed as seen in FIGS. 11 and 12 of the drawings. Correspondingly, when the locking plate 47 is not secured to the frame by fasteners F, axial movement indicated by broken lines in 15 of the drawings is allowed when the caster wheels 41 are deployed.

Referring now to FIGS. 16-21 of the drawings, a fourth alternate drive wheel pair deployment assemblies 50 can be seen on a so equipped self-propelled lawn care equipment representation 51 illustrated graphically. The drive wheel assemblies 50 each have a sliding drive wheel support frame 52 with a pair of vertically upstanding parallel spaced tubular brackets 53 and 54, best seen in FIGS. 19, 20 and 21.

Figure 19:
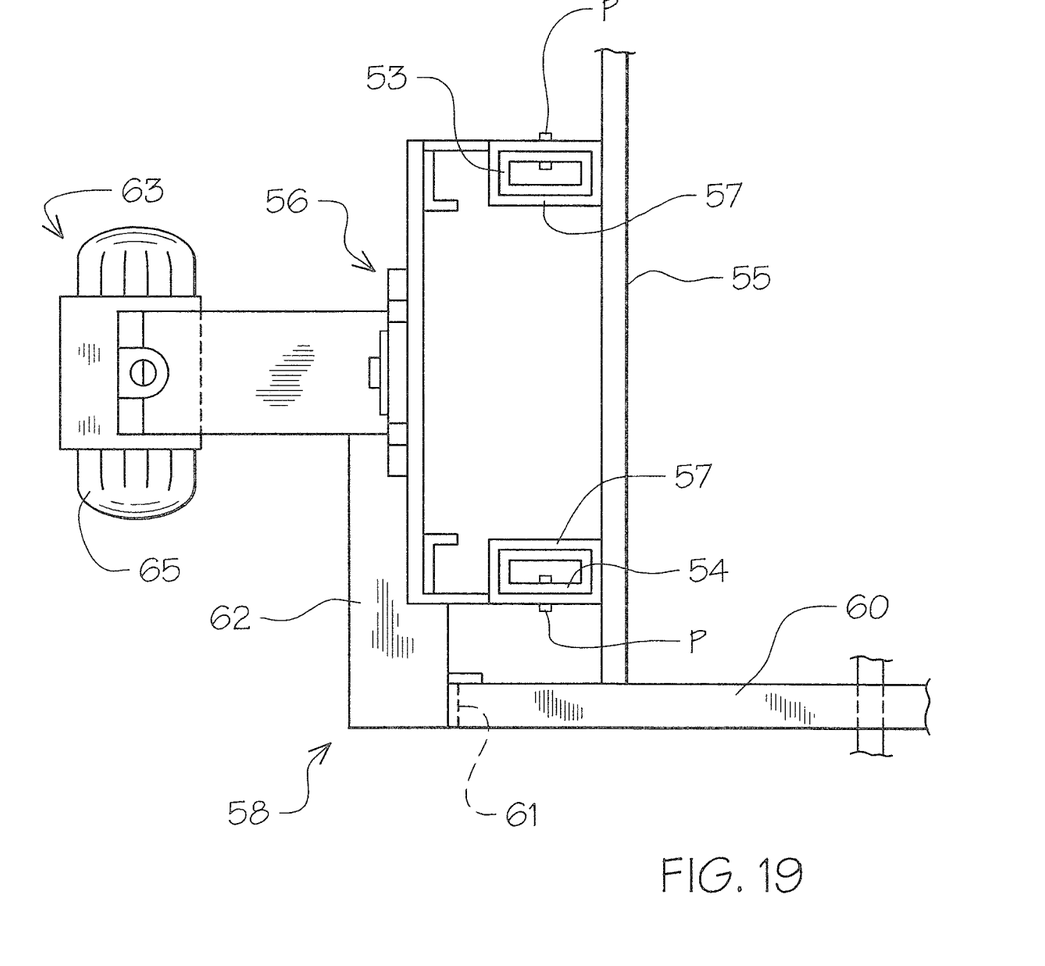
FIG. 19 is a top plan view thereof.
Figure 20:
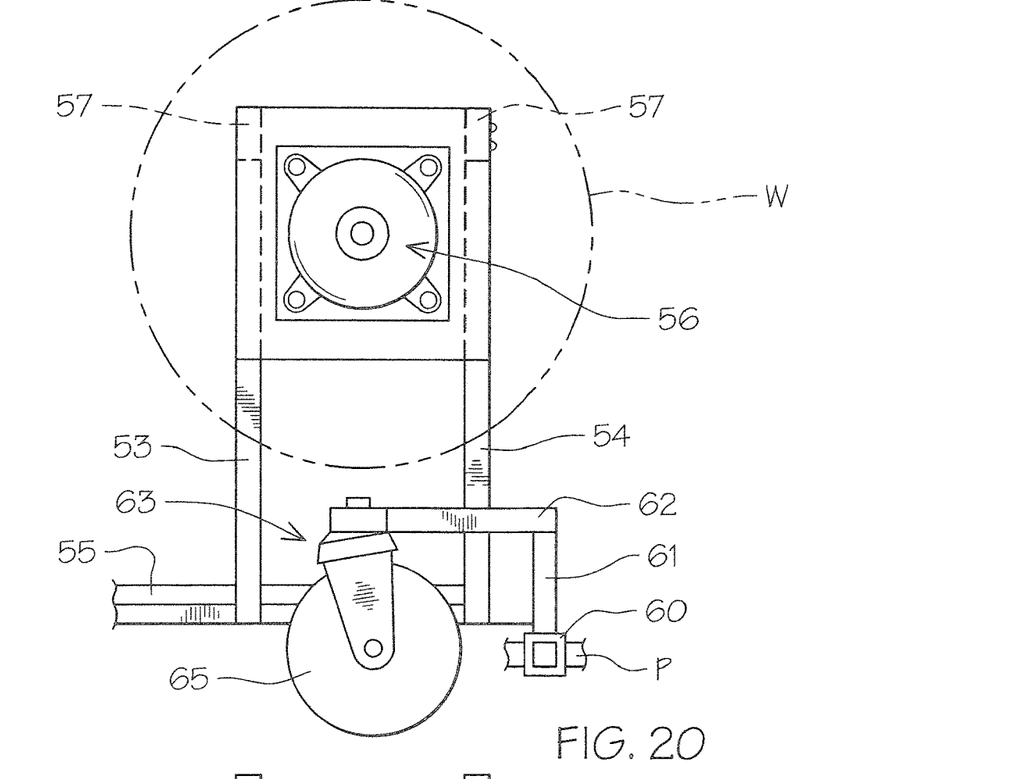
FIG. 20 is a partial side elevational view of a third alternate form of a slide wheel conversion assembly with the caster wheels in place.
Figure 21:
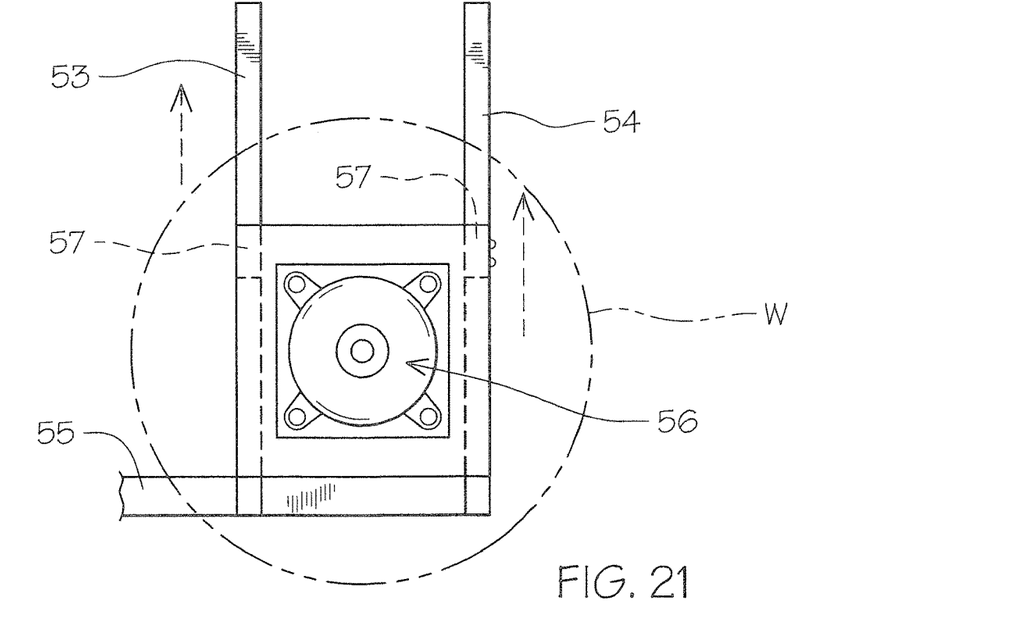
FIG. 21 is a partial side elevational view thereof with the caster wheel assemblies removed and sliding drive wheel deployed for use shown graphically.

The tubular brackets 53 and 54 are secured to one another by a support frame element 55 extending from the vehicle's main support frame shown graphically for illustration purposes.

A hydraulic motor and wheel mount assembly 56 is movably positioned on the respective brackets 53 and 54 by a pair of guide sleeves 57 slidably positioned on the tubular brackets 53 and 54. A pair of locking pins P are provided that extend through aligned apertures in both respective sleeves 57 and the tubular brackets 53 and 54, best seen in FIGS. 18 and 19 of the drawings in both engaged and non-engaged position.

Figure 17:
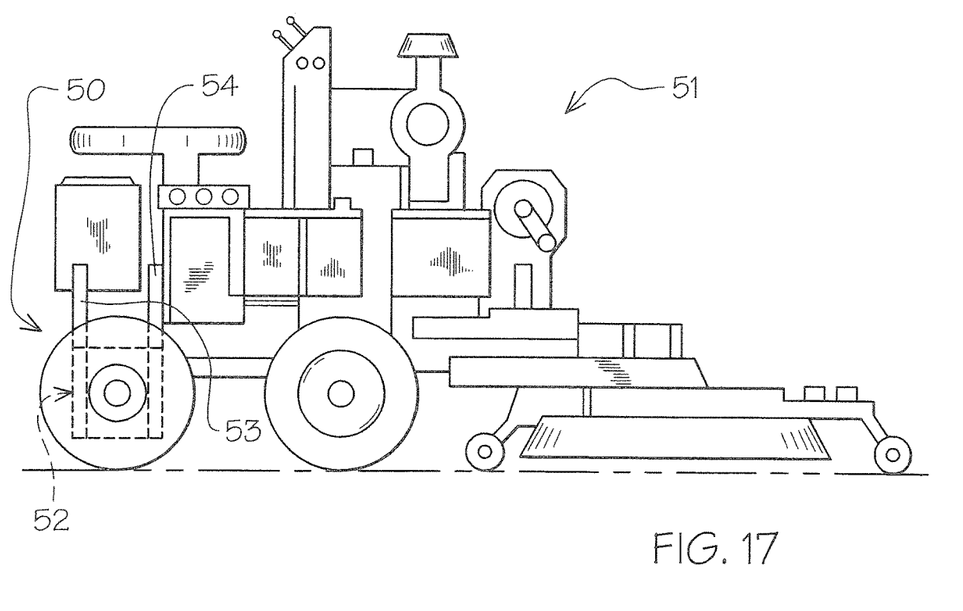
FIG. 17 is a side elevational view thereof in four-wheel drive converted engaged position.
Figure 18:
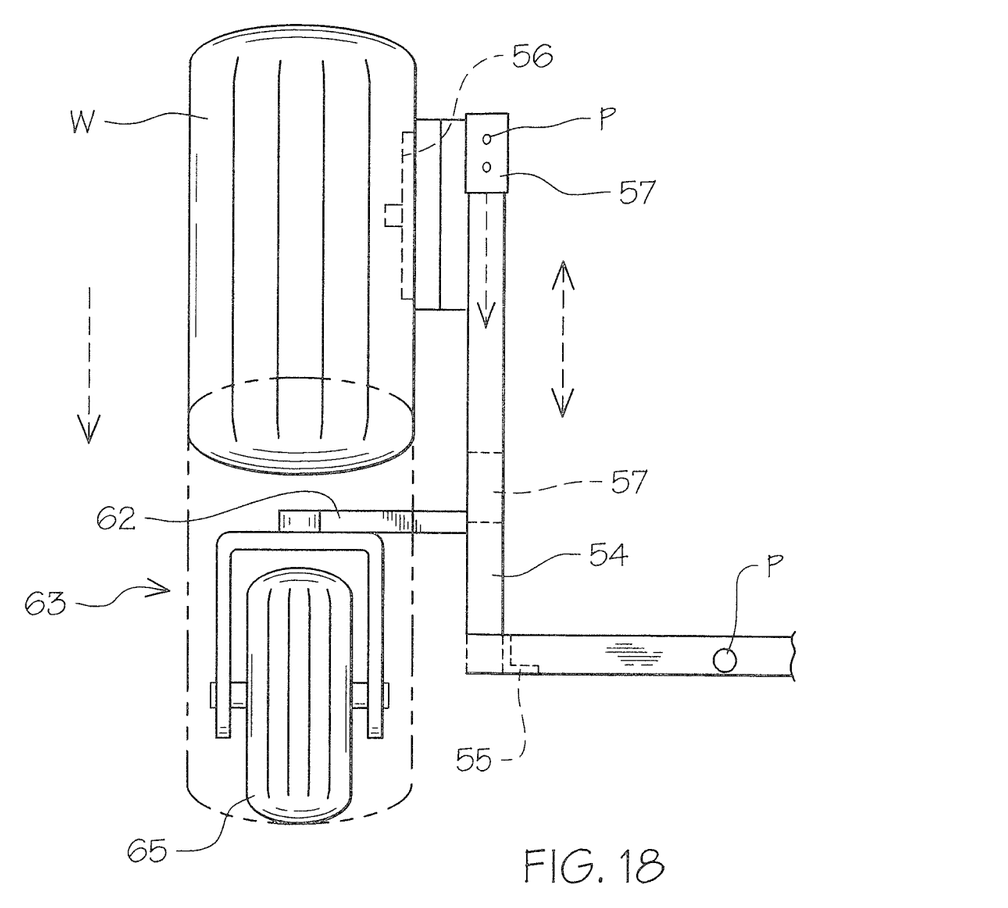
FIG. 18 is an enlarged partial end elevational view of a third alternate form in non-drive engagement position.

This orientation allows for the selective deployment of the drive motor and wheel mount assemblies 56 from a first non-engagement position as seen in FIGS. 16, 18, 19 and 21 of the drawings to a second ground engagement deployed position as seen in FIGS. 17, 18 and 20 of the drawings.

Referring now to FIGS. 18 and 19 of the drawings, a removable caster wheel assembly 58 can be seen having a tubular mounting frame engagement extension 60 from a pivot point PV on the rear of the main frame of the lawncare vehicle as it will be understood by those skilled in the art. The caster wheel assembly 58 has a right angular disposed upstanding extension frame element 61 with an L-shaped tubular frame 62 secured at right angles as seen in FIG. 19 of the drawings. A caster wheel mount 63 is thereby pivotally secured to the free end of the L-shaped frame 63 with a depending caster wheel 65 rotatably positioned therein.

During sliding deployable of the respective drive wheel assemblies, the caster wheel assembly 58 will be removed as seen in FIGS. 17 and 21 of the drawings and correspondingly when the drive wheel assemblies 50 are retracted to a first non-deployment position the caster wheel assemblies 58 will be repositioned for use as seen in FIGS. 16, 18, 19 and 20 of the drawings by securing same to a pivot point from the main vehicle support frame.

It will thus be seen that a new and useful drive wheel conversion system for lawncare equipment has been illustrated and described and it will be apparent to those skilled in the art that various changes and modifications may be made thereto without departing from the spirit of the invention.

Therefore, I claim:

1. A four-wheel drive conversion for a self-propelled two-wheel drive and steering lawncare equipment with non-driven caster wheels on a vehicle support frame comprising,
   a pair of auxiliary independently powered direct drive wheels interchangeable with said non-driven caster wheels,
   said auxiliary independently powered direct drive wheels and said non-driven caster wheels are pivotally secured to said vehicle support frame, said auxiliary independently powered direct drive wheels and said non-driven caster wheels are selectively deployed from a first non-ground engagement position to a second direct ground engagement position rotating around a control central pivot point on said support frame,
   a power source for said auxiliary independently powered direct drive wheels and means for independent control of said auxiliary independently powered direct drive wheels
   wherein each of said auxiliary independently powered direct drive wheels have a hydrostatic motor in communication with said power source and a means for inputting control to said auxiliary independently powered direct drive wheels.

2. The four-wheel drive conversion set forth in claim 1 wherein said auxiliary independently powered direct drive wheels each have a direct drive motor and source of power.

3. The four-wheel drive conversion set forth in claim 1 wherein said auxiliary independently powered direct drive wheels and said non-driven caster wheels are selectively secured in their said respective first non-ground engagement position and said second direct ground engagement position respectively.

4. The four-wheel drive conversion set forth in claim 1 wherein said means for independent control of said auxiliary independently powered direct drive wheels comprises,
   selective application of power to said auxiliary independently powered direct drive wheels from a steering and drive control.

5. The four-wheel drive conversion set forth in claim 1 wherein said auxiliary independently powered direct drive wheels and said pivotally secured non-driven caster wheels are in a vertical orientation position to one another when in said respective spaced direct ground engagement positions.

6. A four-wheel drive conversion for a self-propelled two-wheel drive and steering lawncare equipment and non-driven caster wheels on a vehicle support frame comprises,
   a pair of auxiliary independently powered direct drive wheels slidably positioned vertically within a vertical support frame secured to said vehicle support frame,
   said non-driven caster wheels removably positioned from said vehicle support frame when said independently powered direct drive wheels are in direct ground engagement position,
   a pair of direct drive motors on said respective auxiliary independently powered drive wheels and a source of power,
   independent controlling means for said direct drive motors and, means for selectively mounting said non-driven caster wheels on said vehicle support frame when said drive wheels are in first non-deployed position
   wherein each of said auxiliary independently powered direct drive wheels have a hydrostatic motor in communication with said power source and a means for inputting control to said auxiliary independently powered direct drive wheels.

7. The four-wheel drive conversion for a self-propelled two-wheel drive and steering lawncare equipment set forth in claim 6 wherein said independently powered direct drive wheels and said non-driven caster wheels are in spaced vertically aligned orientation to one another when said non-driven caster wheels are secured to said vehicle support frame and said independently powered drive wheels are in non-ground engagement position.

8. The four-wheel drive conversion set forth in claim 6 wherein said independent controlling means for said direct drive motors comprises, selective application of power to said auxiliary independently powered direct drive wheels for steering and drive control.

9. The four-wheel drive conversion set forth in claim 6 wherein said means for selective mounting said non-driven caster wheels on said vehicle support frame when said auxiliary independently powered direct drive wheels are in said first non-deployed positioned comprises,
   frame extension elements with a caster wheel mount, said non-driven caster wheels rotatably positioned therein.

* * * * *